United States Patent Office 3,176,161
Patented Mar. 30, 1965

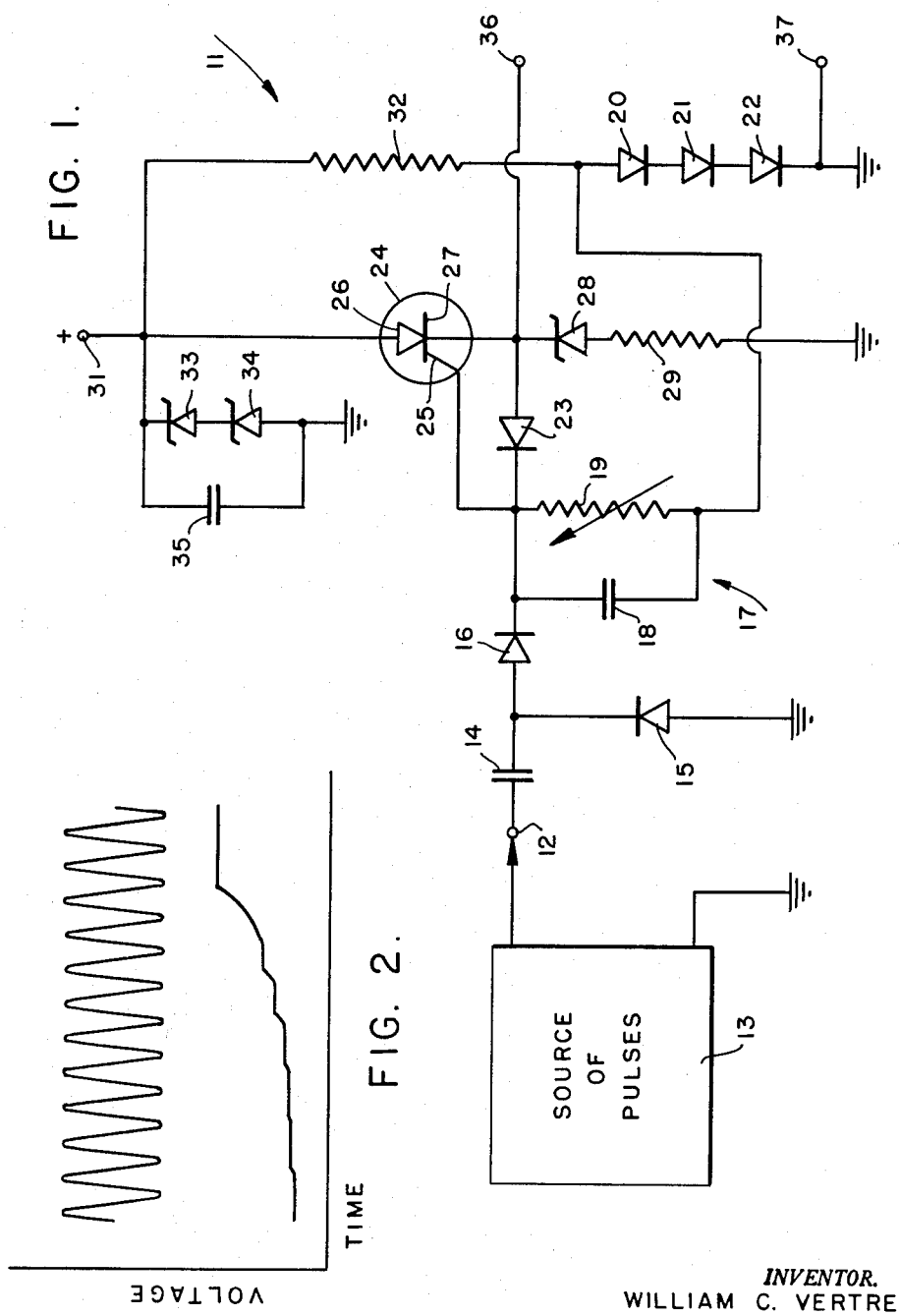

3,176,161
TEMPERATURE-COMPENSATED PULSE-RESPON-
SIVE ELECTRONIC SWITCHING CIRCUIT
William C. Vertrees, Excelsior, Minn., assignor to the
United States of America as represented by the Secretary of the Navy
Filed Jan. 11, 1963, Ser. No. 250,963
14 Claims. (Cl. 307—88.5)
(Granted under Title 35, U.S. Code (1952), sec. 266)

The invention herein described may be manufactured and used by or for the Government of the United States of America for governmental purposes without the payment of any royalties thereon or therefor.

The present invention relates to pulse counting circuits and more particularly to a temperature-compensated, pulse-responsive electronic switching circuit which after switching provides a constant output voltage after a predetermined number of pulses.

Pulse counting circuits are known in the prior art; however, such circuits are generally complex and expensive and are sensitive to temperature change which affects their accuracy or limits their operation to a small temperature range.

The present invention provides a circuit which is relatively simple and compact, is capable of operating over a wide temperature range of −55° C. to 125° C., and employs a single silicon controlled switch which is "fired" or turned "on" by the accumulated charge built up on a storage capacitor by a series of pulses at the input of the circuit and switches a continuous D.C. (direct current) output voltage into the load device.

It is therefore an object of the invention to provide a new and improved electronic switching circuit.

Another object is the provision of a simple, accurate and inexpensive switching circuit.

A further object is to provide a switching circuit which is capable of operation over a considerable temperature range with great accuracy.

Still another object is the provision of a switching circuit having a high degree of stability in operation, accuracy and constancy of output.

Other objects, advantages and novel features of the invention will become apparent from the following detailed description when considered in conjunction with the accompanying drawing wherein:

FIG. 1 is a schematic diagram illustrating a circuit embodying the present invention; and FIG. 2 is a graph illustrating build-up of the charge on the storage capacitor.

Referring now to the drawing, wherein like reference characters designate like or corresponding parts, there is shown in FIG. 1 a schematic diagram illustrating a circuit of the present invention and designated generally by reference numeral 11. The circuit 11 comprises an input terminal 12 to which a source of pulses 13 is adapted to be connected. The source of pulses may be any one of several types of pulse generating means, for example, a low current, high impedance source such as a filter network.

Terminal 12 is connected to one plate of a coupling capacitor 14, the other plate of which is connected to the cathode of a silicon diode 15 and the anode of a silicon diode 16. The anode of diode 15 is connected to ground. The cathode of diode 16 is serially connected through a parallel RC network 17, which network comprises a storage capacitor 18 and a variable resistor 19, and a plurality of forward biased stabistor diodes 20, 21 and 22 in series, to ground. The cathode of diode 16 is also connected to the cathode of a diode 23 and to a silicon controlled switch 24, which has a gate 25, an anode 26 and a cathode 27, at the gate 25 thereof. The cathode 27 of switch 24 is connected to the cathode of a Zener diode 28, the anode of which is connected through a load resistor 29 to ground, the anode of diode 23 being connected to the junction between the cathode 27 of switch 24 and diode 28. The anode 26 of switch 24 is connected to a direct current positive potential source 31, a resistor 32 and to a network comprising a pair of serially connected Zener diodes 33, 34 connected to ground and shunted by a by-pass capacitor 35. The output of the circuit is taken off a pair of terminals 36, 37, terminal 36 being connected to the junction between diodes 23 and 28 and the cathode 27 of switch 24, and terminal 37 being connected to ground.

As an example of the operation of the circuit of the present invention, the source of pulses 13 is connected to terminal 12 and ground. The pulses may be of any predetermined frequency and voltage and the circuit can be adjusted to switch "on" in response to a predetermined number of positive pulses by suitably adjusting the variable resistor 19. The pulses are passed by coupling capacitor 14 to diodes 15 and 16. Diode 15, being reverse biased, conducts in response to negative pulses and shorts them to ground. Diode 16, being forward biased, conducts in response to positive pulses and passes them to storge capacitor 18 and a charge starts building up thereon. The time constant of the RC network 17 is of such value that the capacitor 18 does not discharge completely before the next pulse arrives with the result that the charge builds up to a voltage sufficient to "fire" or turn "on" the switch 24; see FIG. 2. This "firing" voltage is determined by the gate-to-cathode voltage of the switch 24, the breakdown voltage of Zener diode 28 and the voltage drop across resistor 29 when the "firing" current is flowing therethrough. "Firing" or turning "on" of switch 24 places substantially all the voltage from source 31 across the output terminals 36, 37.

Diode 23 provides a safety factor to keep the reverse voltage between the gate and cathode of switch 24 from becoming too large and breaking down the switch. When the anode of diode 23 becomes positive with respect to the gate of switch 24, the diode starts conducting and only the voltage drop across the diode is actually seen at the gate, whereby the reverse gate to cathode voltage is kept small and breakdown of the switch is avoided.

Diodes 20, 21, 22, 28, 33 and 34 help compensate the silicon controlled switch 24 for temperature changes over a range from −55° C. to 125° C. Switch 24 has a negative temperature coefficient while diode 28 has a positive temperature coefficient, whereby at high temperatures it takes less voltage at the gate 25 to "fire" the switch 24 but diode 28 requires more voltage to conduct, the reverse being true at low temperatures, with the result that the positive temperature coefficient of diode 28 compensates for the negative temperature coefficient of the switch 24. Diodes 20, 21 and 22, called stabistors, have negative temperature coefficients while diodes 33 and 34 have very slight positive temperature coefficients and are chosen to have a very small drift in voltage over the temperature range −55° C. to 125° C.

The combined effect of diodes 20, 21, 22, 28, 33 and 34 provide temperature compensation over the aforementioned temperature range so that the circuit will "fire" or switch "on" at the same time over the temperature range.

By-pass capacitor 35 serves to ground transients in the voltage supply 31 and prevent inadvertent "firing" of switch 24.

In one application of the switching circuit of this invention designed to "fire" or turn "on" in response to a series of ten pulses of about 40 millivolts amplitude, peak-to-peak, at a frequency of about 2250 c.p.s., the circuit parameters, stated by way of example only, are as follows:

| | |
|---|---|
| Capacitor 14 | 0.0068 microfarad. |
| Capacitor 17 | 0.033 microfarad. |
| Capacitor 35 | 47 microfarads. |
| Silicon diodes 15, 16, 23 | Type 1N457. |
| Stabistor diodes 20, 21, 22 | Type SG22. |
| Zener diode 28 | Type 1N470. |
| Zener diodes 33, 34 | Type SZ 41 (made by Motorola per Naval Ordnance Test Station Specifications). |
| Resistor 19 | 50K–200K ohms (adjusted to 150K ohms. |
| Resistor 29 | 5.1K ohms. |
| Resistor 32 | 10K ohms. |
| Silicon controlled switch 24 (anode firing current=50 microamperes or less) | Type 3A31A. |
| Potential source 31 | +20 volts, D.C. |

In the operation of a circuit with parameters hereinbefore indicated and with resistor 19 adjusted to a value of about 150K ohms, positive pulses of 40 millivolt amplitude, peak-to-peak, are received and a charge builds up on capacitor 18 until the voltage thereon is sufficient to "fire" or switch "on" silicon controlled switch 24. This voltage is determined by the gate to cathode voltage of the switch, which is approximately one-half of a volt, the voltage required to render Zener diode 28 conducting, which is about seven volts, and the voltage drop, about one-quarter of a volt, resulting from flow of the "firing" current, about 50 microamperes or less, through resistor 29. With the switch 24 turned "on" the drop across the switch is about three-quarters of a volt and with the temperature compensation provided by diodes 20, 21, 22, 28, 33 and 34, the voltage output across terminals 36, 37 is about +20±1 volts D.C.

There has thus been provided a switching circuit which is very stable over a considerable temperature range and which upon actuation applies a substantially constant positive direct current potential to the output of the circuit.

Obviously many modifications and variations of the present invention are possible in the light of the above teachings. It is therefore to be understood that within the scope of the appended claims the invention may be practiced otherwise than as specifically described.

What is claimed is:
1. A switching circuit comprising, in combination:
a source of pulses;
an electronic device having a gate, a cathode and an anode;
a network comprising a storage capacitor shunted by a resistor;
circuitry connecting said source of pulses to one side of said capacitor and to the gate of said device;
the other side of said capacitor being connected to ground through first diode means;
resistor means connecting the anode of said device to ground through said first diode means;
a second diode means also connecting said anode to ground;
a source of direct current positive potential connected to said anode; and
third diode means and resistor means in series connecting the cathode of said device to ground.
2. The circuit of claim 1, further comprising:
a by-pass capacitor in parallel with said second diode means.
3. The circuit of claim 1, further characterized in that said device has a negative temperature coefficient; and said third diode means has a positive temperature coefficient which helps compensate for the negative temperature coefficient of the device.
4. The circuit of claim 3, further characterized in that said first diode means has a negative temperature coefficient and said second diode means has a slight positive temperature coefficient, the combined effect of the temperature coefficients of the device and all the diode means providing temperature compensation over a temperature range from −55° C. to 125° C.
5. The circuit of claim 1, further comprising:
fourth diode means connected to said one side of said capacitor and to said third diode means and the cathode of said device.
6. In a switching circuit, the combination comprising:
pulse generating means;
an electronic device having a gate, a cathode and an anode;
circuitry connecting said pulse generating means to the gate of said device;
a parallel RC network connected to the gate of said device and having a ground side connected to ground;
diode and resistor means connected in series between the cathode of said device and ground;
resistor means connected between the ground side of said RC network and the anode of said device; and
a source of potential connected to said anode of the device.
7. The combination of claim 6, further comprising:
diode means connected between the ground side of the RC network and ground.
8. The combination of claim 6, further comprising:
diode means connected between the anode of said device and ground.
9. The combination of claim 6, further characterized in that said potential source is a direct current positive voltage.
10. The combination of claim 6, further characterized in that said device has a negative temperature coefficient and said diode and resistor means has a positive temperature coefficient.
11. In a switching circuit, the combination comprising:
pulse generating means;
a silicon controlled switch having a gate, a cathode and an anode;
circuitry connecting said pulse generating means to the gate of said switch;
first diode means;
a parallel RC network having one side thereof connected to one side of said diode means and to the gate of said switch;
resistor means connected to the anode of said switch and to the other side of said RC network;
second diode means connected between the last-mentioned side of said RC network and ground;
third diode means having one side connected to ground and the other side connected to the cathode of said switch and to the other side of said first diode means; and
fourth diode means connected between the anode of said switch and ground.
12. The combination of claim 11, further characterized in that
said switch and said second diode means have negative temperature coefficients, and
said third and fourth diode means have positive temperature coefficients.

13. The combination of claim 11, further comprising: a source of potential connected to the anode of said switch.

14. The combination of claim 13 further characterized in that said source of potential is a direct current positive voltage.

References Cited by the Examiner

UNITED STATES PATENTS

| | | | |
|---|---|---|---|
| 2,627,025 | 1/53 | Trembly | 328—210 |
| 3,078,391 | 2/63 | Bunodiere et al. | 307—88.5 |
| 3,098,953 | 7/63 | Herr | 307—88.5 |

FOREIGN PATENTS 1,121,167  1/62  Germany.

JOHN W. HUCKERT, *Primary Examiner.*

ARTHUR GAUSS, *Examiner.*